(12) United States Patent
Betts et al.

(10) Patent No.: US 9,650,049 B2
(45) Date of Patent: May 16, 2017

(54) METHOD FOR INTELLIGENT QUICK BED-IN OF AN AUTOMATIC TRANSMISSION

(71) Applicants: Hyundai America Technical Center, Inc., Superior Township, MI (US); Hyundai Motor Company, Seoul (KR); KIA Motors Corporation, Seoul (KR)

(72) Inventors: Matthew Betts, Columbus, GA (US); BeongYeol You, Gyeonggi-do (KR); Anthony Golletti, Howell, MI (US); Thomas Kieffer, Prattville, AL (US)

(73) Assignees: Hyundai America Technical Center, Inc., Superior Township, MI (US); Hyundai Motor Company, Seoul (KR); KIA Motors Corporation, Seoul (KR)

( * ) Notice: Subject to any disclaimer, the term of this patent is extended or adjusted under 35 U.S.C. 154(b) by 14 days.

(21) Appl. No.: 14/855,140

(22) Filed: Sep. 15, 2015

(65) Prior Publication Data

US 2017/0072965 A1    Mar. 16, 2017

(51) Int. Cl.
*B60W 30/19*    (2012.01)
*B60W 10/10*    (2012.01)
*F16H 61/00*    (2006.01)

(52) U.S. Cl.
CPC ............ *B60W 30/19* (2013.01); *B60W 10/10* (2013.01); *F16H 61/00* (2013.01);
(Continued)

(58) Field of Classification Search
None
See application file for complete search history.

(56) References Cited

U.S. PATENT DOCUMENTS 5,189,908 A * 3/1993 Sano .................. G01M 13/025
                                                          73/116.05
7,421,325 B2    9/2008 Geist et al.
(Continued)

FOREIGN PATENT DOCUMENTS

DE    19856541 A1    6/2000
JP    5547897 B    7/2014
(Continued)

OTHER PUBLICATIONS

European extended Search Report from corresponding European application No. 15189816.0 dated May 17, 2016 (11 pgs).

*Primary Examiner* — Edwin A Young
(74) *Attorney, Agent, or Firm* — Brinks Gilson & Lione (57) ABSTRACT

The present disclosure provides a method for an intelligent quick bed-in of an automatic transmission comprising the steps of operating the vehicle according to a predetermined protocol so that the powertrain controller can learn about powertrain variations and adapt operation of the transmission; obtaining feedback information regarding operator performance of the method and vehicle performance during the method; determining whether the bed-in method was successful by the level of run-up or tie-up, by whether the powertrain controller was allowed to adapt, or by the level of powertrain controller adaptation; and completing the bedding-in process. The method being capable of reducing the time required for a bedding-in process, while improving the reliability of the bedding-in process.

20 Claims, 9 Drawing Sheets

(52) U.S. Cl.
CPC .............. *F16H 2061/0068* (2013.01); *F16H 2061/0087* (2013.01); *F16H 2342/00* (2013.01)

(56) References Cited

U.S. PATENT DOCUMENTS

| | | | |
|---|---|---|---|
| 8,874,336 B2 | 10/2014 | Tessier, Jr. et al. | |
| 2005/0257632 A1* | 11/2005 | Runde .................. | F16H 61/061 73/865.9 |
| 2013/0226417 A1 | 8/2013 | Tessier, Jr. et al. | |
| 2014/0032064 A1* | 1/2014 | Thor .................... | B60W 10/02 701/54 |

FOREIGN PATENT DOCUMENTS

| | | |
|---|---|---|
| KR | 10-0262598 B | 5/2000 |
| KR | 10-1089317 B | 12/2011 |
| WO | WO 2012/019710 A1 | 2/2012 |

\* cited by examiner

# METHOD FOR INTELLIGENT QUICK BED-IN OF AN AUTOMATIC TRANSMISSION

FIELD

The present disclosure relates to a method for an intelligent quick bed-in of an automatic transmission of a vehicle.

BACKGROUND

The statements in this section merely provide background information related to the present disclosure and may not constitute prior art.

Minor shift quality issues are sometimes found in new production vehicles due in part to variation in engine and automatic transmission manufacturing. Shift quality issues can be one of the most common complaints of new production vehicle customers. A significant portion of these shift quality issue complaints occur due to an event that only occurs once or twice early in the owner's driving experience. These shift quality issue complaints can include the transmission feeling rough and the transmission hesitating. Often times, these shift quality events cannot be duplicated at a dealership when the vehicle is brought in by the customer for repair.

Review of such shift quality events has indicated that most of these shift quality issues occur because the controller for the automatic transmission has not yet learned how to compensate for manufacturing and part to part variations. Such shift quality issues only occur once or twice early in the ownership experience because the shift quality issues are generally fixed by the normal automatic transmission adaptation process that occurs as the vehicle is driven in the early stages of vehicle ownership.

Methods have been developed to test for and fix shift quality issues of a transmission before ownership of the vehicle is transferred to the customer. Such methods include bedding-in the automatic transmission of the vehicle prior to delivery of the vehicle to the end-customer by running the vehicle through a set procedure to allow the transmission control unit and engine control unit to learn and compensate for manufacturing and part to part variations. Generally, the set procedure for such bedding-in methods requires that an operator run the transmission through all of the transmission gears at specific time and engine speed intervals. Additionally, the set procedure includes running the transmission through all of the transmission gears multiple times. An exemplary system for bedding in a vehicle is disclosed in U.S. Pat. No. 8,874,336 B2.

We have discovered that in some cases the number of times that the transmission is run through the gears is in excess of what is required for the transmission controller and engine controller to adapt to the variations of the transmission. This results in wasted production time. We have also discovered that in other cases the number of times the transmission is run through its gears is not enough to allow the transmission controller and engine controller to learn and adapt to the variations of the transmission. In such situations only the subjective experience and perception of the test operator are relied upon to determine if the vehicle transmission still has shift quality issues.

SUMMARY

The present disclosure provides a method for an intelligent quick bed-in of an automatic transmission of a vehicle capable of reducing the time required for the bedding-in process, while improving the reliability of the bedding-in process. The method thereby increases production facility efficiency by reducing the duration of the bedding-in process if the transmission or engine controller has successfully adapted to the transmission variations. The method also reduces potential shift quality issues for customers by repeating the bedding-in process until the transmission or engine controller has successfully learned and adapted to the transmission variations.

The present disclosure provides a method for bedding-in an automatic transmission of a vehicle having an engine and a powertrain controller configured to measure and learn about transmission variation and adapt operational parameters associated with shifting of the automatic transmission responsive to the transmission variation. According to one form of the present disclosure, the method comprises the steps of operating the vehicle according to a predetermined protocol so that the powertrain controller can learn about powertrain variations and adapt operation of the transmission; obtaining feedback information from the powertrain controller, the feedback information including accelerator pedal position information and transmission operation information; determining whether a position of an accelerator pedal during the step of operating the vehicle according to the predetermined protocol was within an acceptable position range based on the accelerator pedal position information; determining whether a level of at least one of run-up and tie-up remained below a corresponding run-up and tie-up threshold during operation of the predetermined protocol based on transmission operation information obtained from the powertrain controller; and completing the bedding-in process if the position of the accelerator pedal was within the acceptable position range during operation of the predetermined protocol and the level of at least one of run-up and tie-up did not exceed the corresponding run-up and tie-up threshold during operation of the predetermined protocol.

The method may also include the step of repeating the steps of operating the vehicle according to the predetermined protocol, determining whether the position of the accelerator pedal was within the acceptable position range, and determining whether the level of at least one of run-up and tie-up remained below the corresponding run-up and tie-up threshold, if the position of the accelerator pedal was not within the acceptable position range during operation of the predetermined protocol, or the level of at least one of run-up and tie-up exceeds the corresponding run-up and tie-up threshold during operation of the predetermined protocol.

The method may also include obtaining prohibit value information as part of the feedback information obtained from the powertrain controller. If prohibit value information is obtained from the powertrain controller, the method may further comprise the steps of determining whether the powertrain controller was prevented from adaptation during the step of operating the vehicle according to a predetermined protocol based on the prohibit value information; and repeating the steps of operating the vehicle according to the predetermined protocol, determining whether the position of the accelerator pedal was within the acceptable position range, determining whether the level of at least one of run-up and tie-up remained below the corresponding run-up and tie-up threshold, and determining whether the powertrain controller was prevented from adaptation, if the powertrain controller was prevented from adapting one or more operational parameters during operation of the predetermined protocol.

The method may also include obtaining bed-in learn value information from the powertrain controller. If bed-in learn value information is obtained from the powertrain controller, the method may further comprise the steps of determining whether a level of learned transmission variation of the powertrain controller remained below a corresponding learned transmission variation threshold during the step of operating the vehicle based on the bed-in learn value information; and repeating the steps of operating the vehicle according to the predetermined protocol, determining whether the position of the accelerator pedal was within the acceptable position range, determining whether the level of at least one of run-up and tie-up remained below the corresponding run-up and tie-up threshold, and determining whether the level of learned transmission variation of the powertrain controller remained below the corresponding learned transmission threshold, if the level of learned transmission variation of the powertrain controller is above an allowable learn threshold after operating the predetermined protocol.

The method for bedding-in an automatic transmission of claim may further comprise the step of recording the feedback information obtained during the obtaining step, the position of the accelerator pedal during the step of operating the vehicle, the level of run-up or tie-up during the step of operating the vehicle, and any other data that may be calculated or determined during the performance of the method.

The method may also include the step of configuring the transmission controller or engine controller to store the feedback information at a location accessible to a Controller Area Network (CAN) of the vehicle. Additionally, the feedback information may be obtained by reading the feedback information form the Controller Area Network of the vehicle.

In another form, the method may further comprise the step of first determining whether the powertrain controller is configured to communicate feedback information.

According to yet another form of the present disclosure, a method for bedding-in an automatic transmission of a vehicle having an engine and a powertrain controller configured to measure and learn about a transmission variation and adapt one or more operational parameters associated with shifting of the automatic transmission responsive to the transmission variation, comprises the steps of operating the vehicle according to a predetermined protocol so that the powertrain controller can learn about powertrain variations and adapt operation of the transmission; obtaining feedback information from the powertrain controller, wherein the feedback information includes accelerator pedal position information and prohibit value information; determining whether a position of an accelerator pedal during the step of operating the vehicle according to the predetermined protocol was within an acceptable position range based on the accelerator pedal position information; determining whether the powertrain controller was prevented from adaptation during the step of operating the vehicle according to a predetermined protocol based on the prohibit value information; and completing the bedding-in process if the position of the accelerator pedal was within the acceptable position range during operation of the predetermined protocol and the powertrain controller was not prevented from adaptation during operation of the predetermined protocol.

The method may also include the step of repeating the steps of operating the vehicle according to the predetermined protocol, determining whether the position of the accelerator pedal was within the acceptable position range, and determining whether the powertrain controller was prevented from adaptation, if the position of the accelerator pedal was not within the acceptable position range during operation of the predetermined protocol or the powertrain controller was prevented from adaptation during the step of operating the vehicle according to a predetermined protocol.

The method may also include obtaining transmission operation information as part of the feedback information obtained from the powertrain controller. If transmission operation information is obtained from the powertrain controller, the method may further comprise the steps of determining whether a level of at least one of run-up and tie-up remained below a corresponding run-up and tie-up threshold during operation of the predetermined protocol based on transmission operation information obtained from the powertrain converter, and repeating the steps of operating the vehicle according to the predetermined protocol, determining whether the position of the accelerator pedal was within the acceptable position range, determining whether the powertrain controller was prevented from adaptation, and determining whether the level of at least one of run-up and tie-up remained below the corresponding run-up and tie-up threshold, if the level of at least of run-up or tie-up exceeded the corresponding run-up and tie-up threshold during operation of the predetermined protocol.

The method may also include obtaining bed-in learn value information as part of the feedback information obtained from the powertrain controller. If bed-in learn value information is obtained from the powertrain controller, the method may further comprise the steps of determining whether a level of learned transmission variation of the powertrain controller remained below a corresponding learned transmission variation threshold during the step of operating the vehicle according to the predetermined protocol. This determination may be based on the bed-in learn value information, and repeating the steps of operating the vehicle according to the predetermined protocol, determining whether the position of the accelerator pedal was within the acceptable position range, determining whether the powertrain controller was prevented from adaptation, and determining whether the level of learned transmission variation of the powertrain controller remained below the corresponding learned transmission threshold, if the level of learned transmission variation of the powertrain controller is above an allowable learn threshold after operating the predetermined protocol.

The method for bedding-in an automatic transmission may further comprise the step of recording the feedback information obtained during the obtaining step, the position of the accelerator pedal during the step of operating the vehicle, and whether the powertrain controller was prevented from adaptation during the step of operating the vehicle.

The method may also include the step of configuring the transmission controller or engine controller to store the feedback information at a location accessible to a Controller Area Network of the vehicle. Additionally, the feedback information may be obtained by reading the feedback information form the Controller Area Network of the vehicle.

In another form, the method may further comprise the step of first determining whether the powertrain controller is configured to communicate feedback information.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The present disclosure relates to a method for an intelligent quick bed-in (IQBI) of an automatic transmission of a vehicle. Quick bed-in refers to a process by which shift quality and vehicle performance are tested as part of the production line. A quick bed-in test attempts to force a vehicle transmission to adapt in order to accommodate variations in the transmission and powertrain systems that result from manufacturing and part to part variations of the transmission. The degree of powertrain variation present in a given vehicle transmission dictates the level of adaptation that is required for that particular transmission. As a result of quick bed-in adaptation, shift quality of the automatic transmission can be improved.

Figure 1:
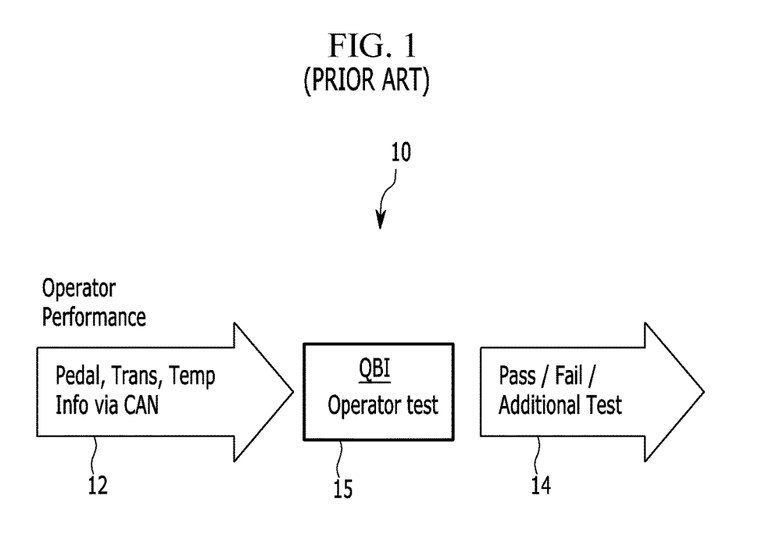
FIG. 1 is a diagram illustrating a general quick bed-in method of the prior art.

An existing quick bed-in method requires that two transmission test cycles be run for every vehicle that reaches the end of an assembly line. A general overview of such an existing quick bed-in method 10 is shown in FIG. 1. In such an existing quick bed-in method 10 an operator runs a set test procedure 15. The set test procedure 15 includes shifting the transmission through the gears at least twice according to specified test parameters 12. Test parameters 12 include information such as an accelerator pedal position, engine speed, and engine temperature. Such an existing quick bed-in process 10 simply checks that the operator performed the set test procedure 15 as required. A pass or fail determination 14 is made based only on whether the set test procedure 15 was adhered to properly by the operator. If the set test procedure 15 was performed correctly, then the transmission is deemed to have passed the quick bed-in test. If the set test procedure 15 was not adhered to properly (i.e. there was an operator error during the test, such as an incorrect pedal position or excessive transmission temperature), the transmission will be deemed to have failed the quick bed-in test and a third set test procedure will be run on that transmission. Such existing quick bed-in procedures do not check the actual vehicle performance during or after the set test procedure 15.

Figure 2:
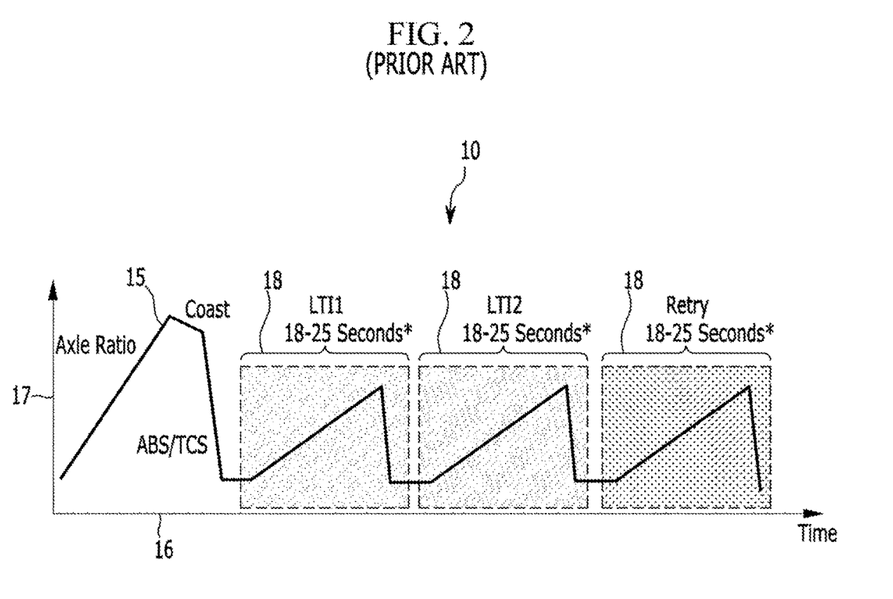
FIG. 2 is a graph showing a typical process and duration of the general quick bed-in method FIG. 1.

FIG. 2 further illustrates the process of an existing quick bed-in method. The graph of FIG. 2 shows time on the horizontal axis 16 and speed on the vertical axis 17. The engine speed obtained during the test procedure 15 is plotted relative to the time duration of the test procedure 15. Such an existing quick bed-in method 10 requires that a minimum of two transmission test cycles 18 be run for every vehicle that reaches the end of an assembly line. Generally, a test cycle 18 lasts eighteen to twenty-five seconds depending on the operator performance. A third test cycle 18 is run if the operator failed to follow the set test procedure 15 of the existing quick bed-in method 10. The duration of the additional test cycle 18 is also eighteen to twenty-five seconds. As such, the total duration of the existing quick bed-in method can be thirty-six seconds to seventy-five seconds or more.

We have discovered that such an existing quick bed-in method can be time consuming in that some vehicles might require only one test cycle 18 to allow the transmission controller to adapt to powertrain variations. Nonetheless, under such an existing quick bed-in method 10, all vehicles on the production line are subjected to a minimum of two test cycles 18. Vehicles containing properly adapted transmission controllers may be subjected to a further, third unnecessary test cycle 18 in the event that the operator fails to perform the test procedure 15 properly (i.e. some test parameter 12 is not satisfied).

We have also discovered that some vehicles may go through the two test cycles 18 and still not have the transmission fully bedded-in. Some vehicles contain transmissions with many manufacturing and part to part variations and may need more than the required two test cycles 18 to allow the transmission controller to adapt to all present powertrain variations. It is left to the operator's subjective perception and experience to determine if a vehicle requires additional bedding-in.

Figure 3:
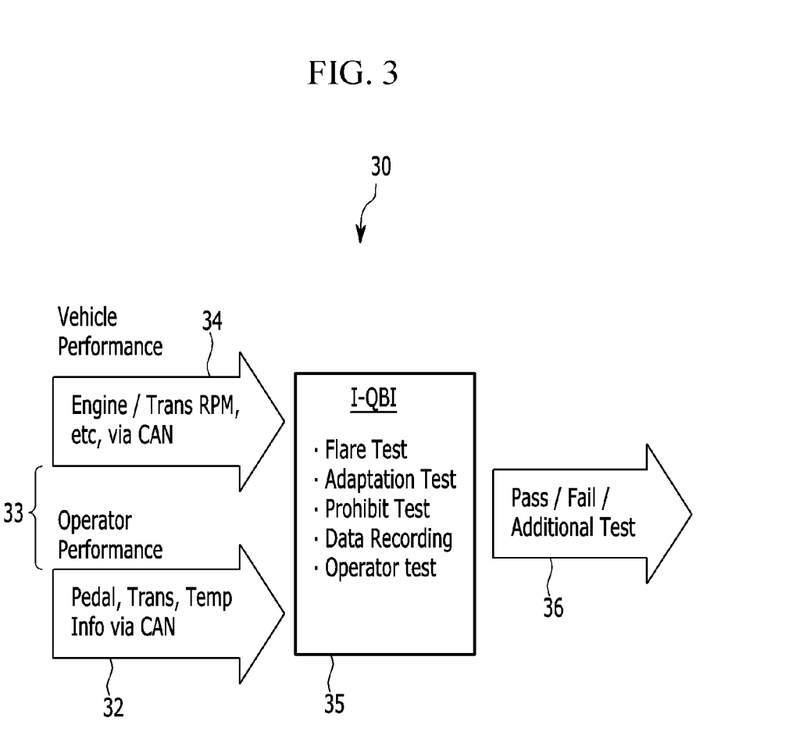
FIG. 3 is a diagram illustrating the general intelligent quick-bed in method for an automatic transmission according to the present disclosure.

Referring now to FIG. 3, the present disclosure provides various forms of a method for an intelligent quick bed-in 30 of an automatic transmission of a vehicle. The quick bed-in method 30 is intelligent in that the performance of the vehicle 34 is checked and monitored as part of the intelligent quick bed-in test 33 to ensure that the transmission controller or engine controller of a vehicle has adequately learned and adapted to powertrain variations. A general overview of the intelligent quick bed-in process 30 according to the present disclosure is shown in FIG. 3. Generally, the intelligent quick bed-in process 30 includes shifting the transmission through the gears at specified test parameters 33, i.e. according to a predetermined protocol. Operator performance 32 during the testing procedure 33 is monitored, and may include information such as an accelerator pedal position, engine speed, and engine temperature. The intelligent quick bed-in process 30 also monitors the vehicle performance 34 during the test procedure 33. The intelligent quick-bed in process 30 then analyzes 35 both operator performance 32 and vehicle performance 34 to make a pass or fail determination 36. The intelligent quick bed-in test is only repeated on vehicles that are deemed to have failed the initial intelligent quick bed-in test.

Figure 4:
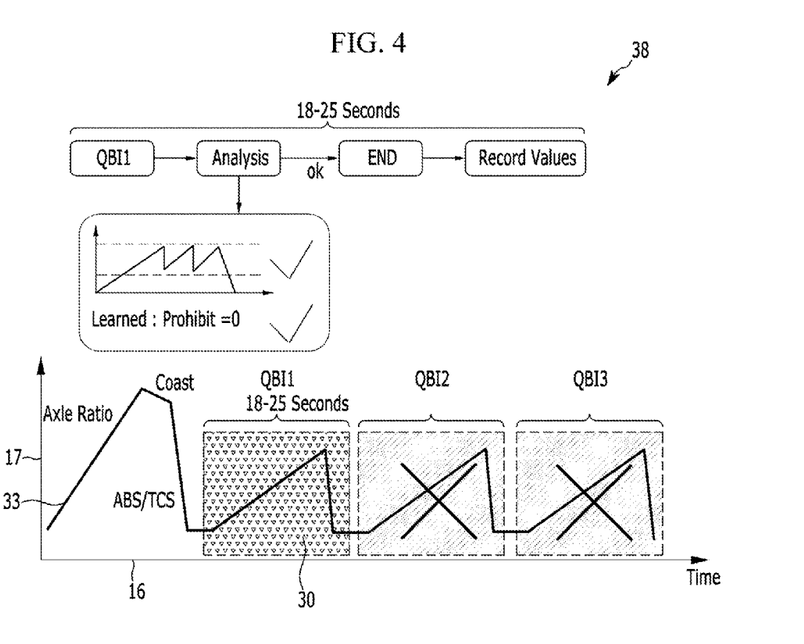
FIG. 4 is a graph showing a bedding-in process using an intelligent quick bed-in method according to the present disclosure in which only one test cycle is needed.

FIG. 4 illustrates an overall bedding-in process 38 in which an intelligent quick bed-in method 30 of the present disclosure is used. The graph of FIG. 4 shows time on the horizontal axis 16 and speed on the vertical axis 17. The engine speed of a vehicle during the bedding-in process 38 is plotted relative to the time of the bedding-in process 38. The bedding-in process using an intelligent quick bed-in method 30 initially only requires that a single IQBI test cycle 30 be run for every vehicle that reaches the end of an assembly line. Like the test cycle 18 of the existing quick bed-in method 10, the IQBI test cycle 30 of the bedding-in process 38 lasts eighteen to twenty-five seconds. Each IQBI test cycle 30 of bedding-in process includes running a transmission through its gears according to a predetermined protocol 33, monitoring operator performance 32 and monitoring vehicle performance 34 during the protocol 33, and analyzing the performances 35. If the operator performance 32 and the vehicle performance 34 are within predetermined protocols of the IQBI method 30, the transmission will be deemed to have passed the IQBI and the IQBI method 30 will end the bedding-in process 38. In other words, if the transmission shifts exactly as it should (i.e. shift flare did not exceed a user specified threshold) and the transmission adapted appropriately during the IQBI method 30, the IQBI method 30 will end.

Figure 5:
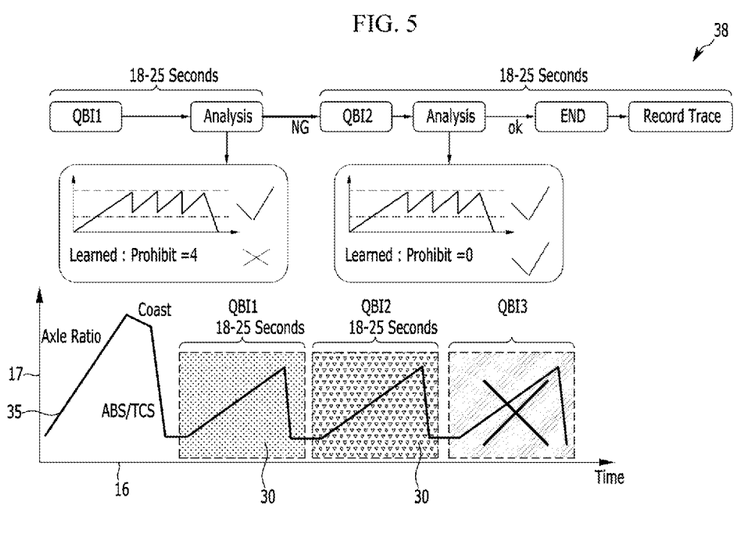
FIG. 5 is a graph showing a bedding-in process using an intelligent quick bed-in method according to the present disclosure in which two test cycles are needed.

For vehicles that do not pass the IQBI method 30 after a single IQBI method test cycle 30, an additional IQBI test cycle 30 may be provided. The graph of FIG. 5 illustrates a bedding-in process 38 using an IQBI method 30 for such a car. The graph shows time on the horizontal axis 16 and speed on the vertical axis 17. The engine speed during the bedding-in process 38 is plotted relative to the time of the bedding-in process 38. In this situation, the vehicle's performance is deemed to have failed the IBQI analysis. The failure may be the result of operator error, the transmission experiencing shift flare above a user set threshold, the transmission controller not adapting properly, or the controller adapting too much in a single instance. After a first failed IQBI test cycle 30, a second IQBI method test cycle 30 will be performed perform. If the operator performance 32 and the vehicle performance 34 are within predetermined protocols of the IQBI method 30, the transmission will be deemed to have passed the IQBI and the IQBI method 30 will end. In other words, if the transmission shifts exactly as it should (e.g. shift flare did not exceed a user specified threshold) and the transmission adapted appropriately during the IQBI method 30, the IQBI method 30 will end. The duration of a bedding-in process 38 using an IQBI method 30 when two IQBI test cycles 30 are run is thirty-six to fifty seconds, the same as two cycles 18 of the existing quick bed-in method 10. However, the IQBI method 30 offers more certainty than a standard quick bed-in method 10 that the transmission controller has adapted to transmission and powertrain variations properly and that all shift quality issues have been successfully resolved.

Figure 6:
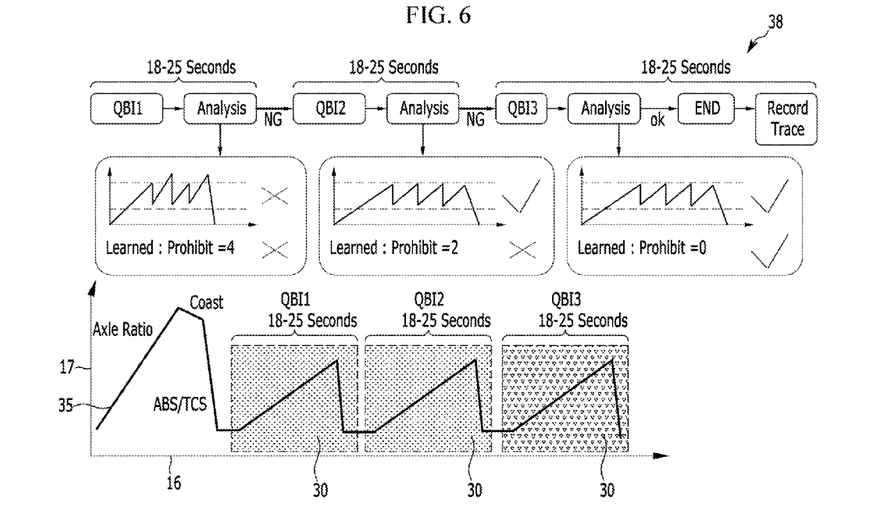
FIG. 6 is a graph showing a bedding-in process using an intelligent quick bed-in method according to the present disclosure in which several test cycles are needed.

For vehicles that do not pass the IQBI method 30 after a second IQBI test cycle 30, an additional, third IQBI test cycle 30 may be provided. The graph of FIG. 6 illustrates the bedding-in process 38 using an IQBI method 30 for such a car. The graph shows time on the horizontal axis 16 and speed on the vertical axis 17. The engine speed during the bedding-in process 38 is plotted relative to the time of the bedding-in process 38, for several IQBI method test cycles 38. In this situation, the vehicle's performance is deemed to have failed the IBQI analysis in both the first IQBI test cycle 30 and second IQBI method test cycle 30. The failures may be the result of operator error, the transmission experiencing shift flare above a user set threshold, the transmission controller not adapting properly, or the controller adapting too much in a single instance. After a first and second failed IQBI test cycles 30, a third IQBI method test cycle will be performed. If in this third IBQI test cycle 30 the operator performance 32 and the vehicle performance 34 are within predetermined protocols of the IQBI method 30, the transmission will be deemed to have passed the IQBI and the IQBI method 30 will end. In other words, if the transmission shifts exactly as it should (i.e. shift flare did not exceed a user specified threshold) and the transmission adapted appropriately during the IQBI method 30, the IQBI method 30 will end. The duration of the bedding-in process 38 using an IQBI method 30 when three IQBI method test cycles 30 are run is fifty-four to seventy-five seconds, the same as two required test cycles 18 and an additional third test cycle 18 due to operator error of the existing quick bed-in method 10. The IQBI method 30 assures that the transmission controller has adapted to transmission and powertrain variations properly and that all shift quality issues have been successfully resolved. If a transmission is deemed to have failed the third IQBI test cycle 30, additional IQBI test cycles 30 may be performed to try to force the powertrain controller to adapt, or the bedding-in process using an IQBI method 30 may end and the vehicle with the problematic transmission may be flagged for further analysis by an IQBI method or by a human operator.

A software package containing an intelligent quick bed-in logic tree may be applied to an existing roll booth tester. Such roll booths may be used at the end of an assembly line to test for powertrain variations and force a powertrain controller (i.e. a transmission controller, an engine controller, both a transmission controller and an engine controller, or a separate controller communicating with the transmission controller and/or engine controller) to learn and adapt to those powertrain variations. It will also be understood by those skilled in the art that the IQBI method 30 may also be applied to situations other than at the end of an assembly line. An IQBI method 30 may also be used at a dealership prior to or after a start of the end-customer's ownership experience. An IQBI method 30 might also be used by dealerships or mechanics to test the performance of a transmission and force the powertrain controller to adapt to transmission variations after maintenance or repair of the transmission.

Intelligent quick bed-in systems 30 directly monitor vehicle shift performance to check for shift irregularities. Referring again to FIG. 3, the IQBI 30 checks for shift irregularities based on user-set test criteria for an automatic transmission. A user may configure an IQBI test method 30 to include as many or as few user-set test criteria or parameters as desired. User-set test criteria may include a run-up test, a tie-up test, an adaptation prohibition test, a level of adaptation test, a pedal position test, an operator test, or any combination thereof. The user-set test criteria determine the test procedure 33 of an IQBI test method 30. The pass/fail parameters for various user-set IQBI test criteria may be based on information obtained from manufacturing plants or research and development teams that are indicative of powertrain variations or abnormalities that can lead to shift quality issues for customers (i.e. shift flare and tie-up). The IQBI test method 30 obtains feedback information from the vehicle's Controller Area Network (CAN) or powertrain controller (as used herein means a transmission controller, an engine controller, both a transmission controller and an engine controller, or a separate controller communicating with the transmission controller and/or engine controller) to monitor how the transmission of a vehicle is performing and determine if, based on the user-set test criteria, the vehicle passes the IQBI test 30. The IQBI 30 analyzes 35 the feedback information throughout the test procedure 33 in accordance with the user-set test criteria. The IQBI 30 then then determines whether the vehicle passes 36 the IQBI test procedure 33 as defined by the user-set test criteria.

Each test criteria can be selectively enabled or disabled by a user depending on factors including manufacturing plant standards, quality standards, and efficiency targets. Test criteria that may be enabled or disabled to create various combinations of test procedures 35 of an IQBI method 30 include, but are not limited to a run-up test, a tie-up test, an adaptation prohibition test, an level of adaptation test, a pedal position test, an operator test, or any combination thereof. Use of such quantifiable test criteria to create the various forms of the test procedures of an IQBI method 30, ensure that transmission performance testing is objective and efficient. In other words, an IQBI 30 is capable of quantifying shift shock and forcing a powertrain controller to adapt its operating parameters in order to avoid shift quality issues observed by a vehicle customer. Prior quick bed-in methods were not able to quantify shift shock and shift quality issues in this way.

Vehicle operational information related to the user-set test criteria may be sent from the CAN of the vehicle via Local Identifiers (LIDs). A LID is a message that communicates vehicle operational information from the CAN. Once communicated by the CAN, the LIDs are read by test equipment such as a roll booth. The vehicle operational information conveyed by the LIDs is analyzed and used in calculations by the IQBI 30 to determine and quantify the vehicle performance in terms of the user-set test criteria. Vehicle operational information that may be communicated during an IQBI method 30 may include, but is not limited to transmission operation information, expected torque converter speed in a current gear of a transmission, expected torque converter speed in the next gear of a trans mission, engine speed, torque converter lock-up, clutch adaptation values, clutch adaptation status, torque request, transmission oil temperature, body number of the vehicle, vehicle powertrain configuration, gear ratios, derived shift flare, derived shift tie-up, accelerator pedal position, throttle position, or a combination thereof. This information is not monitored by existing quick bed-in methods.

Figure 7:
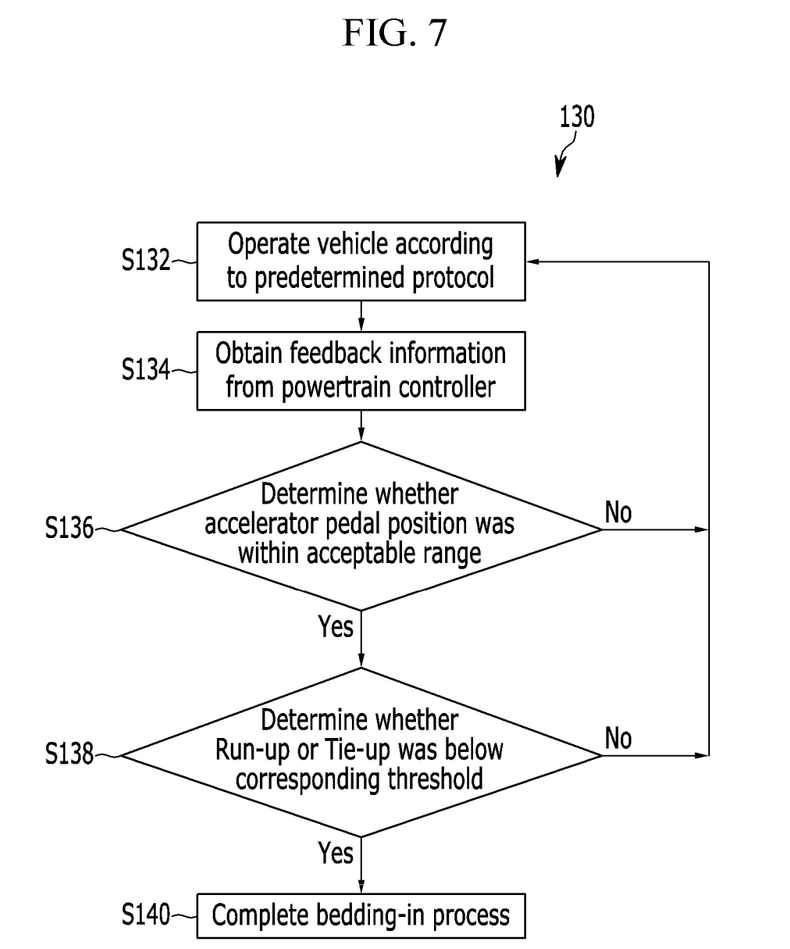
FIG. 7 is a flowchart showing one form of an intelligent quick bed-in method according to the present disclosure.
Figure 8:
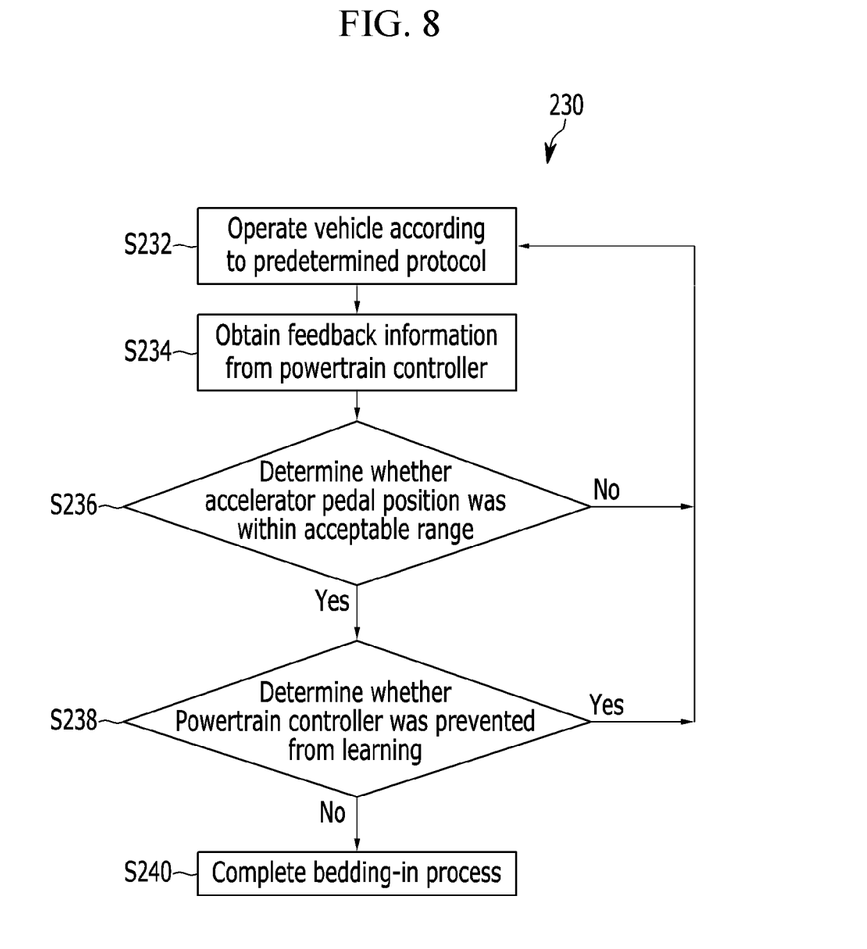
FIG. 8 is a flowchart showing a second form of an intelligent quick bed-in method according to the present disclosure.
Figure 9:
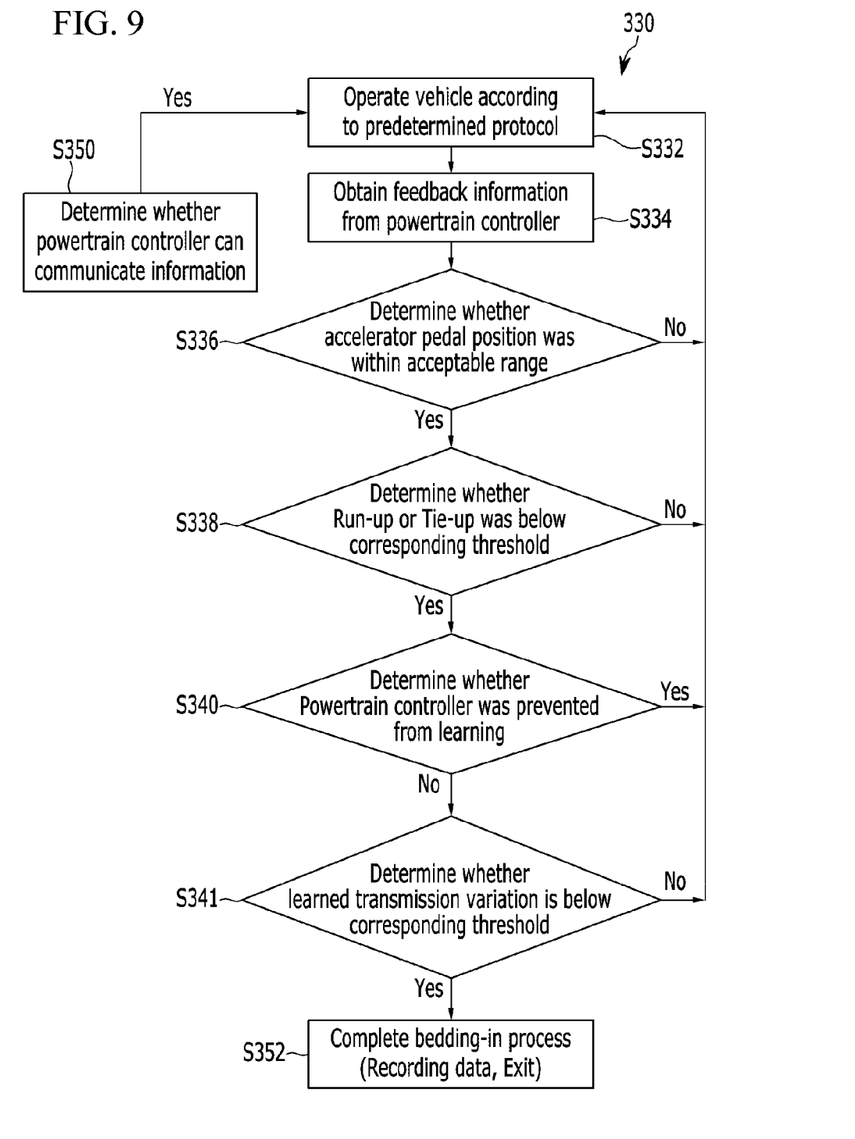
FIG. 9 is a flowchart showing a third form of an intelligent quick bed-in method according to the present disclosure.

Examples of how an IQBI method 30 may be configurable by a user or plant by enabling or disabling various test criteria can be seen in FIGS. 7-9. FIG. 7 shows one form of the IQBI method 130 according to the present disclosure. The IQBI method 130 starts once a vehicle having an automatic transmission and a powertrain controller configured to measure and learn about transmission variation associated with shifting of the transmission responsive to the transmission variation is connected to the test equipment containing IQBI method 130 software. For example, the vehicle may be situated on a roll booth engine operation simulator.

Once connected to the test equipment an IQBI method 130 may start by operating the vehicle according to a predetermined protocol S132. This step may be automated by the test equipment or it may be commenced by a user input. As noted above, a user may be provided the option to select which aspects or parameters of the predetermined protocol will be run in any test cycle. The predetermined protocol may include shifting through the gears of the transmission at set time or engine speed intervals to allow the powertrain controller to learn about and adapt to powertrain variations that exist in the powertrain or transmission.

Next, the IQBI 130 test equipment or an associated computer may obtain feedback information from the powertrain controller during step S134. The power train controller may include an engine controller and/or a transmission controller, or a separate controller that communicates with the engine and/or transmission controller. The information obtained from the powertrain controller may include, but is not limited to transmission operation information, expected torque converter speed in a current gear of a transmission, expected torque converter speed in the next gear of a trans mission, engine speed, torque converter lock-up, clutch adaptation values, clutch adaptation status, torque request, transmission oil temperature, body number of the vehicle, vehicle powertrain configuration, gear ratios, derived shift flare, derived shift tie-up, accelerator pedal position, throttle position, or a combination thereof. This information may be obtained via sensors placed at various points throughout the vehicle. This information may be communicated via the Controller Area Network (CAN) of a vehicle. The feedback information that is obtained during an obtaining step S134 is determined based on what feedback information is needed to determine the user-set or user-enabled test criteria. The IQBI method 130 shown in FIG. 7 obtains at least accelerator pedal position information and transmission operation information during the obtaining step S134. Transmission operation information may include speed or acceleration information for various parts that make up a transmission, including a transmission output shaft, a transmission input shaft, or a vehicle part such as a torque converter. An engine controller or transmission controller may be configured to store such feedback information at a location that is accessible to the CAN.

Next, the IQBI method 130, in step S136 determines whether a position of an accelerator pedal was within an acceptable accelerator pedal position range while the vehicle was operated according to the predetermined test protocol in step S132. The step of determining if the accelerator pedal was within an acceptable range at step S136 may be part of the IQBI method 130 checking that the operator properly operated the vehicle according to the predetermined test protocol during step S132. This step or a related supplemental step may also include comparing pedal position during a gear shift to determine if pedal irregularities occurring during a shift event, e.g. sharp movement of the pedal during a shift could result in no adaptation, thus indicating the powertrain controller should be subject to further bedding-in.

According to a form of the present disclosure, the IQBI method 130 may be entirely repeated from the operating step S132 if the accelerator pedal position is determined at step S136 to not have within an acceptable pedal range during step S132.

The next steps of the IQBI method 130 of FIG. 7 is a user-set or user-enabled test criteria. Step S138 includes determining whether indicators of shift quality issues are present in the transmission. As shown in step S138, the method may include determining whether a level of run-up or tie-up is below a corresponding run-up or tie-up threshold. Run-up and tie-up are characteristics of a transmission that has not yet adapted to powertrain variations. Determining levels of run-up or tie-up present in a transmission is a way to quantify shift shock. Shift shock is what drivers perceive that often generate shift quality issue complaints.

Run-up occurs when the speed of a torque converter increases past where it is supposed to during a shift event. This occurs when either the current gear is released too soon or the next gear is applied too late. This reduces the load on the engine momentarily, causing the engine speed to increase and then decrease quickly, resulting in shift shock felt by the vehicle driver. At step S138, the IQBI system 130 will analyze the transmission operation information obtained during step S134. The IQBI software determines a level of run-up by subtracting the expected torque converter speed in a current gear (NTi) from the actual torque converter speed (NT). If NT-NTi is greater than zero, the transmission is experiencing run-up. The IQBI method 130 may then determine if the level of run-up is below a run-up threshold. Based on test data this run-up threshold may be programed into the IQBI method 130 to be approximately 200 RPM because that is the level of shift flare or run-up that a driver would perceive. However, the run-up threshold may be changed and configured by a user within the IQBI 130 software.

Tie-up occurs when the speed of a torque converter drops too much during a shift event. This is when the current gear is released too late or the next gear is applied too soon. This increases the load on the engine, which reduces the engine speed momentarily. The wheels then pull up the engine speed as the next gear is engaged, resulting in a very hard shock felt by the vehicle driver. At step S138, the IQBI system 130 will analyze the transmission operation information obtained during step S134. The IQBI software determines a level of tie-up by subtracting the expected torque converter speed in a next gear (NTj) from the actual torque converter speed (NT). If NT-NTj is less than zero, the transmission is experiencing tie-up. The IQBI method 130 may then determine if the level of tie-up is below a tie-up threshold. Based on test data this tie-up threshold may be programed into the IQBI method 130 to be approximately 100 RPM to 200 RPM because that is the general level of shift flare or tie-up that a driver would perceive. However, the tie-up threshold may be changed and configured by a user within the IQBI 130 software to higher or lower RPM values.

Additional test criteria may be enabled to be included in the IQBI method 130. For example, a powertrain controller adaptation state step or a powertrain controller learn level step may be added. Details of such additional steps will be explained below.

According to a form of the present disclosure, the IQBI method 130 may be entirely repeated from the operating step S132 if the level of run-up or tie-up is determined to be above the corresponding run-up or tie-up threshold at step S138.

Once the IQBI 130 determines that the powertrain controller has learned and adapted to the transmission or powertrain variations by repeating the IQBI method 130 as many times as the system or user deems necessary, the IQBI method 130 is completed in step S140. The completing step S140 may include recording the obtained feedback information and/or calculated test criteria data. Such information and data may be recorded by the test equipment as a log of the vehicle's performance over the duration of the IQBI test.

FIG. 8 shows another form of the IQBI method 230 according to the present disclosure. This IQBI method 230 demonstrates that the test criteria may be enabled or disabled by a user. IQBI 230 is similar to IQBI 130 in that it includes an operating step S232, an obtaining step S234, and a step S236 in which a determination is made as to whether the position of an accelerator pedal is within an acceptable range. However, the IQBI method 230 the run-up and tie-up determination step has been disabled by a user and a powertrain controller learn or adaptation state test criteria has been enabled by a user. Alternatively, a run-up and tie-up determination may be enabled while the powertrain controller learn of adaptation state is also enabled.

The IQBI method 230 starts once a vehicle having an automatic transmission and a powertrain controller configured to measure and learn about transmission variation associated with shifting of the transmission responsive to the transmission variation is connected to the test equipment containing the IQBI method 230 software. For example, the vehicle may be situated on a roll booth engine operation simulator.

Once connected to the test equipment an IQBI method 230 may start by operating the vehicle according to a predetermined protocol at step S232. This step may be automated by the test equipment or it may be commenced by a user input. The predetermined protocol may include shifting through the gears of the transmission at set time or engine speed intervals to allow the powertrain controller to learn about and adapt to powertrain variations that exist in the powertrain or transmission.

Next, the IQBI 230 test equipment or an associated computer may obtain feedback information from the powertrain controller or the CAN at step S234. The power train controller may include an engine controller and/or a transmission controller, or a separate controller that communicates with the engine and/or transmission controller. The information obtained from the powertrain controller may include, but is not limited to transmission operation information, expected torque converter speed in a current gear of a transmission, expected torque converter speed in the next gear of a trans mission, engine speed, torque converter lock-up, clutch adaptation values, clutch adaptation status, torque request, transmission oil temperature, body number of the vehicle, vehicle powertrain configuration, gear ratios, derived shift flare, derived shift tie-up, accelerator pedal position, throttle position, or a combination thereof. This information may be obtained via sensors placed at various point throughout the vehicle. This information may be communicated via the Controller Area Network (CAN) of a vehicle. The feedback information that is obtained during an obtaining step S234 is determined based on what feedback information is needed to determine the user-set or user-enabled test criteria. The IQBI method 230 shown in FIG. 8 obtains at least accelerator pedal position information and prohibit value information during the obtaining step S234. In some forms of the present disclosure, an engine controller or transmission controller may be configured to store such feedback information at a location that is accessible to the CAN.

Next, the IQBI method 230, in step S236 determines whether a position of an accelerator pedal was within an acceptable accelerator pedal position range while the vehicle was operated according to the predetermined test protocol in step S232. The step of determining if the accelerator pedal was within an acceptable range at step S236 may be part of the IQBI method 230 checking that the operator properly operated the vehicle according to the predetermined test protocol during step S232.

According to some forms of the present disclosure, the IQBI method 230 may be entirely repeated from the operating step S232 if the accelerator pedal position is determined to not be within an acceptable pedal range at step S236.

The next steps of the IQBI method 230 of FIG. 8 is a user-set or user enabled test criteria. Step S238 includes determining whether the powertrain controller was prevented from learning and adapting to powertrain variations during step S232 of operating the vehicle according to a predetermined protocol. During step S238, the method may include determining whether the operating step S232 was performed under acceptable conditions. If certain drive conditions are present when step S232 occurs, the powertrain controller may be prevented from adapting to powertrain or transmission variations. Examples of conditions that would trigger a prohibit value and therefore prevent a powertrain controller from adapting new operating parameters include, but are not limited to an unacceptable output speed, a gradient or hill, oil temperature, and first shift event of the day. Preventing the powertrain controller from adapting under poor driving conditions is a function of the powertrain controller's programming. A powertrain controller may be programmed to communicate that it was unable to adapt or was prohibited from adaptation. Such a communication can take the form of a prohibit value. In IQBI 230, prohibit values may be communicated from the powertrain controller during step S234. In step S238, the IQBI 230 analyzes the prohibit value information to determine whether the powertrain controller was in a state to successfully adapt to any powertrain or transmission variations that may have been present in the operating step of S232. When the IQBI 230 detects that the powertrain controller was prevented from adapting a new operation parameter based on the presence of a prohibit value, the IQBI method 230 may be entirely repeated from the operating step S232. Additional test criteria may be enabled to be included in the IQBI method 230. For example, a run-up or tie-up level step or a powertrain controller learn level step may be added. Details of such additional steps are explained above and below, respectively.

Once the IQBI 230 determines that the powertrain controller has learned and adapted to the transmission or powertrain variations by repeating the IQBI method 230 as many times as the system or user deems necessary, the IQBI method 230 is completed in step S240. The completing step S240 may include recording the obtained feedback information and/or calculated test criteria data. Such information and data may be recorded by the test equipment as a log of the vehicle's performance over the duration of the IQBI test.

FIG. 9 shows another form of the IQBI method 330 according to the present disclosure. IQBI method 330 further demonstrates that the test criteria may be enabled or disabled by a user. IQBI 330 is similar to IQBI 130 and 230 in that it includes an operating step S332, an obtaining step S334, and a step S336 in which determination is made as to whether the position of an accelerator pedal is within an acceptable range. According to some forms of the present disclosure, the IQBI method 330 may be entirely repeated from the operating step S332 if the accelerator pedal position is determined to not be within an acceptable pedal range at step S336.

IQBI method 330 also includes a user-set or user enabled test criteria for determining whether indicators of shift quality issues are present in the transmission. Step S338 may include determining whether a level of run-up and/or tie-up is below a corresponding run-up or tie-up threshold. As described above, run-up and tie-up are characteristics of a transmission that has not yet adapted to powertrain variations. Determining levels of run-up or tie-up present in a transmission is a way to quantify shift shock. Shift shock is what drivers perceive and often generate shift quality issue complaints. This step could alternatively be disabled. According to some forms of the present disclosure, the IQBI method 330 may be entirely repeated from the operating step S332 if the level of run-up and/or tie-up is determined to be above a corresponding run-up or tie-up threshold in step S 338.

IQBI method 330 also includes a user-set or user-enabled test criteria for determining a powertrain controller learn or adaptation state. As described above, this step S340 allows the IQBI 330 to determine whether a powertrain controller was allowed to adapt any operating parameters during the step S332 of operating the vehicle according to a predetermined protocol. This step could alternatively be disabled. According to some forms of the present disclosure, the IQBI method 330 may be entirely repeated from the operating step S332 if the powertrain controller was prevented from adaptation in step S332 based on the existence of prohibit value information obtained in step S334.

Another example of a user-set or user-enabled test criterion can be seen in step S341, in which the IQBI 330 determines whether the level of learned transmission variation of the powertrain controller remained below a corresponding learned transmission variation threshold during the step S332 of operating the vehicle according to a predetermined protocol. This step may be used because some powertrain controllers may be configured to limit the amount of operation parameter adaptation that may be accomplished in a single bedding-in process. According to an IQBI method 330 containing this step S341, a learned transmission variation level threshold may be set in the IQBI software. This threshold may be less than or equal to the amount of adaptation allowed by the powertrain controller. If a level of learned transmission variation of the powertrain controller after the operating step S332 is determined by the IQBI 330 at step S341 to be above the corresponding learned transmission variation threshold, the entire IBQI method 330 may be repeated in order to ensure the powertrain controller does not require an additional significant amount of operational parameter variation. A transmission requiring such extensive powertrain controller adaptation may contain additional, unknown defects that could lead to customer complaints. The IQBI method 330 may be repeated until the level of learned transmission variation of the powertrain controller is under the corresponding threshold, or the vehicle may be flagged for further inspection.

The IQBI method 330 again starts once a vehicle having an automatic transmission and a powertrain controller configured to measure and learn about transmission variation associated with shifting of the transmission responsive to the transmission variation is connected to the test equipment containing IQBI method 330 software.

Once connected to the test equipment an IQBI method 330 and all other forms of the present disclosure may include the additional step S350, in which the IQBI system determines whether the powertrain controller is capable of communicating feedback information to the IQBI test equipment. This step S350 could include reading the Vehicle Identification Number (VIN), checking the powertrain controller configuration for that particular vehicle, and checking the software of the test equipment. If it is determined that the powertrain controller is not configured to communicate such feedback information as is required by the IBQI 330, a standard transmission bedding-in process may be conducted without the intelligent communication from the car and without monitoring the vehicle's performance during the test.

Once the IQBI 330 determines that the powertrain controller has learned and adapted to the transmission or powertrain variations by repeating the IQBI method 330 as many times as the system or user deems necessary, the IQBI method 330 is completed in step S352. The completing step S352 may include recording the obtained feedback information and/or calculated test criteria data. Such information and data may be recorded by the test equipment as a log of the vehicle's performance over the duration of the IQBI test.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method for bedding-in an automatic transmission of a vehicle having an engine and a powertrain controller, the powertrain controller configured to measure and learn about a transmission variation and adapt one or more operational parameters associated with shifting of the automatic transmission responsive to the transmission variation, the transmission having an input shaft receiving torque from the engine, the method comprising the steps of:
    operating the vehicle according to a predetermined protocol so that the powertrain controller can learn about powertrain variations and adapt operation of the transmission;
    obtaining feedback information from the powertrain controller, the feedback information including accelerator pedal position information and transmission operation information;
    determining whether a position of an accelerator pedal during the step of operating the vehicle according to the predetermined protocol was within an acceptable position range based on the accelerator pedal position information;
    determining whether a level of at least one of run-up and tie-up remained below a corresponding run-up and tie-up threshold during operation of the predetermined protocol based on the transmission operation information obtained from the powertrain controller; and
    completing the bedding-in process if the position of the accelerator pedal was within the acceptable position range during operation of the predetermined protocol and the level of at least one of run-up and tie-up did not exceed the corresponding run-up and tie-up threshold during operation of the predetermined protocol.

2. The method for bedding-in an automatic transmission of claim 1, wherein the feedback information of the obtaining step further includes prohibit value information.

3. The method for bedding-in an automatic transmission of claim 2, further comprising the steps of:
    determining whether the powertrain controller was prevented from adaptation during the step of operating the vehicle based on the prohibit value information; and
    repeating the steps of operating the vehicle according to the predetermined protocol, determining whether the position of the accelerator pedal was within the acceptable position range, determining whether the level of at least one of run-up and tie-up remained below the corresponding run-up and tie-up threshold, and determining whether the powertrain controller was prevented from adaptation, prior to the step of completing the bedding-in process if the powertrain controller was prevented from adapting one or more operational parameters during operation of the predetermined protocol.

4. The method for bedding-in an automatic transmission of claim 1, wherein the feedback information of the obtaining step further includes bed-in learn value information.

5. The method for bedding-in an automatic transmission of claim 4, further comprising the steps of:
    determining whether a level of learned transmission variation of the powertrain controller remained below a corresponding learned transmission variation threshold during the step of operating the vehicle based on the bed-in learn value information; and
    repeating the steps of operating the vehicle according to the predetermined protocol, determining whether the position of the accelerator pedal was within the acceptable position range, determining whether the level of at least one of run-up and tie-up remained below the corresponding run-up and tie-up threshold, and determining whether the level of learned transmission variation of the powertrain controller remained below the corresponding learned transmission threshold, prior to the step of completing the bedding-in process if the level of learned transmission variation of the powertrain controller is above an allowable learn threshold after operating the predetermined protocol.

6. The method for bedding-in an automatic transmission of claim 1, further comprising the step of recording the information obtained during the obtaining step, the position of the accelerator pedal during the step of operating the vehicle, and the level of at least one of run-up and tie-up during the step of operating the vehicle.

7. The method for bedding-in an automatic transmission of claim 1 further comprising the step of configuring at least one of a transmission controller and an engine controller to store the feedback information at a location accessible to a controller area network.

8. The method for bedding-in an automatic transmission of claim 7 wherein the obtaining step includes reading feedback information from the controller area network.

9. The method for bedding-in an automatic transmission of claim 1 further comprising the step of determining whether the powertrain controller is configured to communicate feedback information.

10. The method for bedding-in an automatic transmission of claim 1 further comprising the step of:
    repeating the steps of operating the vehicle according to the predetermined protocol, determining whether the position of the accelerator pedal was within the acceptable position range, and determining whether the level of at least one of run-up and tie-up remained below the corresponding run-up and tie-up threshold, prior to the step of completing the bedding-in process if at least one of:
    a) the position of the accelerator pedal was not within the acceptable position range during operation of the predetermined protocol; and
    b) the level of at least one of run-up and tie-up exceeds the corresponding run-up and tie-up threshold during operation of the predetermined protocol.

11. A method for bedding-in an automatic transmission of a vehicle having an engine and a powertrain controller, the powertrain controller configured to measure and learn about a transmission variation and adapt one or more operational parameters associated with shifting of the automatic transmission responsive to the transmission variation, the transmission having an input shaft receiving torque from the engine, the method comprising the steps of:
- operating the vehicle according to a predetermined protocol so that the powertrain controller can learn about powertrain variations and adapt operation of the transmission;
- obtaining feedback information from the powertrain controller, the feedback information including accelerator pedal position information and prohibit value information;
- determining whether a position of an accelerator pedal during the step of operating the vehicle according to the predetermined protocol was within an acceptable position range based on the accelerator pedal position information;
- determining whether the powertrain controller was prevented from adaptation during the step of operating the vehicle according to a predetermined protocol based on the prohibit value information; and
- completing the bedding-in process if the position of the accelerator pedal was within the acceptable position range during operation of the predetermined protocol and the powertrain controller was not prevented from adaptation during operation of the predetermined protocol.

12. The method for bedding-in an automatic transmission of claim 11, wherein the feedback information of the obtaining step further includes transmission operation information.

13. The method for bedding-in an automatic transmission of claim 12, further comprising the steps of:
- determining whether a level of at least one of run-up and tie-up remained below a corresponding run-up and tie-up threshold during operation of the predetermined protocol based on transmission operation information obtained from the powertrain controller; and
- repeating the steps of operating the vehicle according to the predetermined protocol, determining whether the position of the accelerator pedal was within the acceptable position range, determining whether the powertrain controller was prevented from adaptation, and determining whether the level of at least one of run-up and tie-up remained below the corresponding run-up and tie-up threshold, prior to the step of completing the bedding-in process if the level of at least one of run-up and tie-up exceeded the corresponding run-up and tie-up threshold during operation of the predetermined protocol.

14. The method for bedding-in an automatic transmission of claim 11, wherein the feedback information of the obtaining step further includes bed-in learn value information.

15. The method for bedding-in an automatic transmission of claim 14, further comprising the steps of:
- determining whether a level of learned transmission variation of the powertrain controller remained below a corresponding learned transmission variation threshold during the step of operating the vehicle based on the bed-in learn value information; and
- repeating the steps of operating the vehicle according to the predetermined protocol, determining whether the position of the accelerator pedal was within the acceptable position range, determining whether the powertrain controller was prevented from adaptation, and determining whether the level of learned transmission variation of the powertrain controller remained below the corresponding learned transmission threshold, prior to the step of completing the bedding-in process if the level of learned transmission variation of the powertrain controller is above an allowable learn threshold after operating the predetermined protocol.

16. The method for bedding-in an automatic transmission of claim 11, further comprising the step of recording the information obtained during the obtaining step, the position of the accelerator pedal during the step of operating the vehicle, and whether the powertrain controller was prevented from adaptation during the step of operating the vehicle.

17. The method for bedding-in an automatic transmission of claim 11 further comprising the step of configuring at least one of a transmission controller and an engine controller to store the feedback information at a location accessible to a Controller Area Network of the vehicle.

18. The method for bedding-in an automatic transmission of claim 17 wherein the obtaining step includes reading feedback information from the Controller Area Network of the vehicle.

19. The method for bedding-in an automatic transmission of claim 11 further comprising the step of determining whether the powertrain controller is configured to communicate feedback information.

20. The method for bedding-in an automatic transmission of claim 11 further comprising the step of:
- repeating the steps of operating the vehicle according to the predetermined protocol, determining whether the position of the accelerator pedal was within the acceptable position range, and determining whether the powertrain controller was prevented from adaptation, prior to the step of completing the bedding-in process if at least one of:
  - a) the position of the accelerator pedal was not within the acceptable position range during operation of the predetermined protocol; and
  - b) the powertrain controller was prevented from adaptation during the step of operating the vehicle according to a predetermined protocol.

\* \* \* \* \*